UNITED STATES PATENT OFFICE.

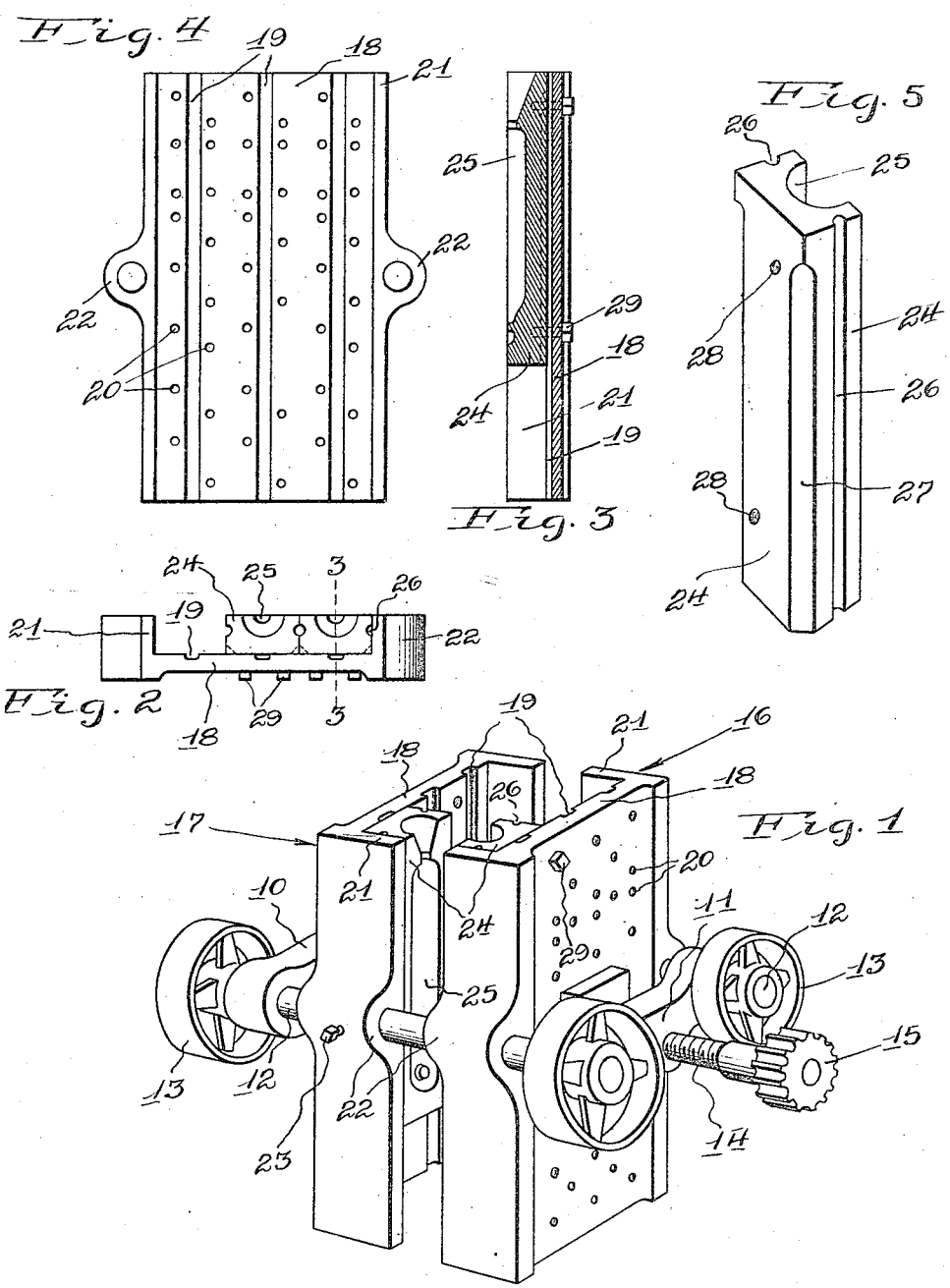

CHARLES HENRY LISTER, OF NORTH ST. PAUL, MINNESOTA.

MOLD FOR CASTING-MACHINES.

1,240,229.  Specification of Letters Patent.  Patented Sept. 18, 1917.

Application filed May 25, 1916. Serial No. 99,766.

*To all whom it may concern:*

Be it known that I, CHARLES HENRY LISTER, a citizen of the United States, residing at North St. Paul, in the county of Ramsey and State of Minnesota, have invented new and useful Improvements in Molds for Casting-Machines, of which the following is a specification.

My invention relates to improvements in molds for casting-machines, particularly of the type disclosed in Patent No. 1,033,254, issued to me July 23, 1912, and also described in my application for patent filed June 21, 1915, and bearing Serial Number 35,256. In these casting-machines, an endless series of mold carriages, having molds thereon, pass loading and discharging stations and are submerged in a cooling bath in each cycle of their travel. Each mold comprises separable members having registering recesses in their adjacent faces and when said members are held together they provide a form or mold to receive molten metal, but when separated permit the discharge of the molded product. Each mold member consists of a solid block of metal, the recesses therein being machined or otherwise suitably formed.

In the manufacture of window weights, it is particularly desirable that quick changes be made from one size of mold to another so that quantities of window weights of a specified size may be produced in a relatively short time, thereby eliminating the necessity of carrying in stock large quantities of weights of various sizes. In changing one set of molds for another in the machines heretofore in use, it is necessary to dismantle the mold carriage, substitute the heavy mold members for others and carefully readjust the parts.

It is the object of my present invention to provide molds for casting-machines, comprising separable frames or holders and a plurality of dies for each frame adapted to be quickly and easily applied thereto and detached therefrom.

A further object is to provide a mold of this type constructed to avoid the warping of its parts.

Other novel features of construction and further advantages of my improvement will hereinafter appear.

In the drawings, Figure 1 is a perspective view illustrating my improved mold and a carriage upon which it is mounted; Fig. 2 is a plan view of one of the mold members and shows two dies applied thereto; Fig. 3 is a longitudinal, sectional view taken on the line 3—3 of Fig. 2; Fig. 4 is an elevation of one of the mold members; and Fig. 5 is a detail, perspective view of one of the dies.

Referring to the drawings (Fig. 1), I have used the reference numerals 10 and 11 to indicate the side bars of a mold carriage, said bars being joined at their ends by shafts 12 upon which wheels 13 are revolubly mounted. A screw 14 threaded at right-angles in the side bar 11 is supplied at its outer end with a driving gear 15 and is revolubly attached (connection not shown) at its inner end of the movable member of my improved mold, which will now be described. This mold consists of two similar frames or holders 16 and 17. Each of these frames is U-shaped in transverse section, the web 18 thereof being formed with longitudinal grooves 19 and also with a number of perforations 20. The flanges 21 are formed with transverse ears 22 and these ears are bored centrally to receive the shafts 12 of the carriage. Set-screws 23 in the ears 22 of the frame 17 engage the shafts 12 and secure said frame, while the other frame 16, which is connected with the screw 14, is free to slide upon said shafts. Said frames 16 and 17 face each other and the channels therein receive companion dies 24. These dies are blocks of iron or steel having recesses 25 in the faces thereof to receive and mold the molten metal. Each die has longitudinal grooves 26 in its sides, and the outer corners 27 thereon, except at their upper ends, are beveled (Fig. 5). In the back of each die, threaded bores 28 are formed to receive machine bolts 29, which are inserted through suitable perforations 20 in the frame to which the die is applied. Companion dies are identical, but in different sets of dies, the length and breadth and the recesses 25 may be varied at will. Thus, it will be seen that each frame may carry one or more dies of the same or different patterns. The thickness of the dies is, however, uniform so that when the faces of one set are brought together, upon the closing of the mold, the faces of other pairs of dies in the frames will also rest in contact with each other. The large number of perforations 20 in the webs 18 of the mold frames are furnished so that any die may be attached in any desired position upon a mold frame. It is obvious, in this connection, that more than two threaded bores 28 may be formed in the back of each die, if desired.

The grooves 19 in the webs 18 of the frames, the beveled corners 27 on the dies 24 and the grooves 26 in the sides of said dies form passageways between the dies and frames through which cooling liquid may pass when the molds are submersed.

It is to be noted that to vary the output of a machine, it is only necessary to furnish additional dies for the molds and this may be done at relatively small expense, as compared with procuring additional molds of the old type, which are comparatively costly in construction and heavy and bulky to transport.

Having described my invention, what I claim as new and desire to protect by Letters Patent, is:

1. In a device of the class described, the combination with a carriage having mold-supports thereon, separable frames mounted on said supports, a plurality of companion dies adapted to be carried upon said frames, and means for detachably securing the dies upon the frames, portions of said frames and dies being cut away to form passageways for a cooling fluid between their contacting surfaces.

2. A mold, comprising a frame and a plurality of dies mounted in said frame, portions of said dies being cut away to form passageways for a cooling fluid between their contacting surfaces.

3. In a device of the class described, the combination with a mold-support of a separable mold, comprising two frames carried upon said support, said frames being U-shaped in cross-section and arranged so that the channels therein register when the mold is closed, the webs of said frames being grooved longitudinally at their inner sides and formed with a number of perforations, and a plurality of dies for said frames, each die comprising a block having beveled rear corners, grooved sides and a recess in its face, and threaded perforations in the back thereof adapted to receive bolts passing through perforations in said webs.

4. In a device of the class described, the combination with a mold-carriage having two parallel supporting shafts, of a separable mold, comprising two frames, said frame being U-shaped in cross-section and arranged so that the channels therein register when the mold is closed, the webs of said frames being grooved longitudinally and formed with a plurality of perforations therein and the flanges of said frames being each formed with a transverse ear bored to receive a supporting shaft of the mold-carriage and a plurality of dies for said frames, each die comprising a block having a recess in its face and threaded perforations in the back thereof adapted to receive bolts passing through registering perforations in said webs.

Whereof, I have hereunto subscribed my name to this specification.

CHARLES HENRY LISTER.